United States Patent
Doe et al.

(10) Patent No.: US 6,869,497 B2
(45) Date of Patent: Mar. 22, 2005

(54) TWO-PART STRUCTURAL ADHESIVE SYSTEMS AND LAMINATES INCORPORATING THE SAME

(75) Inventors: Daniel Keith Doe, Roslindale, MA (US); Donald Edmond Gosiewski, Peabody, MA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/822,186

(22) Filed: Apr. 9, 2004

(65) Prior Publication Data

US 2004/0197587 A1 Oct. 7, 2004

Related U.S. Application Data

(62) Division of application No. 10/072,696, filed on Feb. 7, 2002, now Pat. No. 6,730,411.

(51) Int. Cl.[7] .................. C08F 20/10; C08F 123/10; C08F 222/10; B32B 9/00; B32B 19/00
(52) U.S. Cl. .................... 156/326; 156/327; 8526/318; 8526/328
(58) Field of Search .............................. 156/326, 327; 526/318, 328

(56) References Cited

U.S. PATENT DOCUMENTS

| | | | |
|---|---|---|---|
| 4,014,103 A | 3/1977 | Roth | 260/857 |
| 4,017,315 A | 4/1977 | Vukasovich et al. | 106/14 |
| 4,223,115 A | 9/1980 | Zalucha et al. | 525/455 |
| 4,293,665 A | 10/1981 | Zalucha et al. | 525/255 |
| 4,295,909 A | 10/1981 | Baccei | 156/307 |
| 4,322,509 A | 3/1982 | Zalucha | 525/287 |
| 4,403,052 A | 9/1983 | Largman et al. | 524/394 |
| 4,452,944 A | 6/1984 | Dawdy | 525/126 |
| 4,467,071 A | 8/1984 | Dawdy | 525/112 |
| 4,536,546 A | 8/1985 | Briggs | 525/83 |
| 4,703,089 A | 10/1987 | Damico | 525/245 |
| 4,769,419 A | 9/1988 | Dawdy | 525/111 |
| 4,855,001 A | 8/1989 | Daminco et al. | 156/303.3 |
| 4,942,201 A | 7/1990 | Briggs et al. | 525/71 |
| 4,959,405 A | 9/1990 | Briggs et al. | 524/321 |
| 5,096,962 A | 3/1992 | Holmes-Farley et al. | 524/742 |
| 5,112,691 A | 5/1992 | Briggs et al. | 428/412 |
| 5,206,288 A | 4/1993 | Gosiewski et al. | 525/83 |
| 5,424,355 A | 6/1995 | Uemae et al. | 524/507 |
| 5,656,703 A | 8/1997 | Costin et al. | 525/531 |
| 6,086,798 A | 7/2000 | Hirukawa | 252/582 |
| 6,562,181 B2 * | 5/2003 | Righettini | 156/331.6 |

FOREIGN PATENT DOCUMENTS

EP  0 334 492  9/1989

OTHER PUBLICATIONS

Material Safety Data Sheet, Part No.: 0967 "MA 820 Adhesive", ITW Plexus, (pp. 1–7) Aug. 22, 2001.
Material Safety Data Sheet, Part No.: 0913, "MA 820 Activator", ITW Plexus, (pp. 1–6) Jul. 8, 1999.

* cited by examiner

*Primary Examiner*—Nathan M. Nutter
(74) *Attorney, Agent, or Firm*—Pitney Hardin LLP

(57) ABSTRACT

A two-part adhesive systems exhibiting improved fixture and open times are disclosed. In one embodiment, the system includes (a) an adhesive part being a mixture formed from (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid, and (b) an activator part which includes a free radical generator. In another embodiment, the system includes the above-described adhesive part substantially free of a metal salt of an ethylenically unsaturated carboxylic acid. Curable adhesives and laminates prepared with the two-part system are also disclosed.

19 Claims, 1 Drawing Sheet

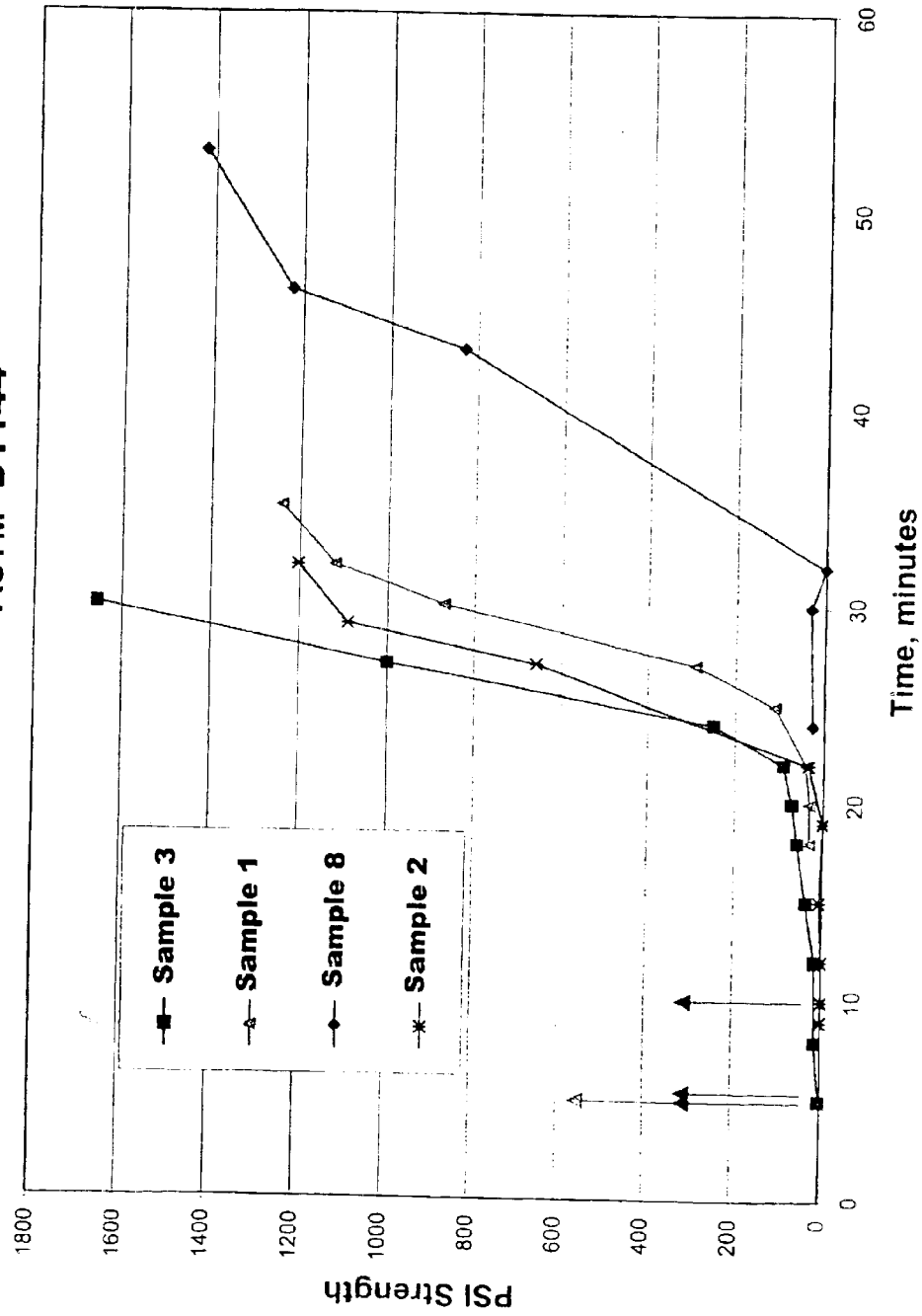

TWO-PART STRUCTURAL ADHESIVE SYSTEMS AND LAMINATES INCORPORATING THE SAME

RELATED APPLICATIONS

This application is a division of application Ser. No. 10/072,696, filed Feb. 7, 2002 now U.S. Pat. No. 6,730,411 entitled "TWO-PART STRUCTURAL ADHESIVE SYSTEMS AND LAMINATES INCORPORATING THE SAME", which is incorporated herein by reference.

FIELD OF THE INVENTION

The present invention relates to two-part structural adhesives useful for bonding metal and polymeric substrates and more particularly to acrylate and methacrylate-based two-part structural adhesives and coatings.

BACKGROUND OF THE INVENTION

Structural adhesives have found broad use in the modern-day manufacturing environment. In the automobile industry, for example, the adhesive bonding of metals to plastics has found wide application where the use of rivets or other mechanical fasteners is impractical due to considerations of aesthetics, cost or corrosion (due to the use of dissimilar metals). Such adhesive bonding applications have found broader acceptance due to recent advancements in formulations of adhesives, which allow effective bonding to metals (see U.S. Pat. Nos. 4,293,665 and 4,452,944, both assigned to Lord Corp.), bonding to solvent-resistant plastics (see U.S. Pat. No. 4,714,730, assigned to ITW, Inc.) and for low temperature applications (see U.S. Pat. No. 4,942,201, assigned to ITW, Inc.). The teachings of these four references are hereby incorporated by reference.

The effectiveness and strength of these adhesives allows for the substitution of adhesives for mechanical connectors such as bolts and rivets. In metal-bonding applications, such mechanical connectors can have disadvantages, such as appearance, cost or corrosion due to the dielectric effects of dissimilar metals. Many manufacturing situations employ adhesives to effect the bonding of two substrates, such as plastic to metal and metal to metal for reasons of economy and aesthetics.

Acrylate and methacrylate adhesives are generally known in the industry. U.S. Pat. No. 4,536,546 assigned to ITW of Glenview, Ill., the contents of which are incorporated herein by reference, describes a methacrylate based adhesive which employs a methacrylate ester monomer with a aldehyde-amine catalyst, a chlorinated polyethylene polymer and a graft copolymer. U.S. Pat. Nos. 4,942,201 and 4,714,730, also assigned to ITW, the contents of which are incorporated herein by reference, describe adhesives made with methacrylate and acrylate based adhesives together with various other additives and ingredients for use in the construction of large objects.

Metal bonding adhesives are also described in the art. U.S. Pat. No. 4,452,944, assigned to Lord Corp., describes a formulation composed of acrylates and methacrylates monomers, polymerizable non-acrylic monomers (styrenes), isocyanate functional prepolymers reacted with polyols, phosphorous compounds, oxidation/reduction systems capable of effecting a room temperature cure, tertiary amines as accelerators, metal molybdates and polybasic lead salts of phosphoric acid. The use of urethane prepolymers and the absence of carboxylic acids in this reference is intended to improve resistance to heat degradation of the adhesive.

In view of the above, it is apparent that progress in the development of metal bonding adhesives is an ongoing process. However, there is still a continuing need for improved adhesive systems. Therefore, it is an object of the present invention to provide an improved two-part adhesive system.

SUMMARY OF THE INVENTION

The present invention provides two-part adhesive systems that exhibit improved onset of handling strength as well improved open times. In a first embodiment, a two-part system is provided which includes an adhesive part and an activator part. The adhesive part is a mixture formed from (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid. The activator part includes a free radical generator. Preferred ethylenically unsaturated monomers include acrylate or methacrylate ester monomers with methyl methacrylate being particularly preferred. The adhesive part can further include an admixed elastomeric material having a $T_g$ less than −25° C. and soluble in the ethylenically unsaturated monomer. Preferred elastomeric materials are polychloroprene, polyacrylonitrile-butadiene copolymers, copolymers of styrene and isoprene, copolymers of styrene and butadiene, carboxylated polychloroprenes, carboxylated polyacrylonitrile-butadiene copolymers, copolymers of ethylene and vinyl acetate, copolymers of styrene and olefinically unsaturated hydrocarbons, polybutylene, acrylate-based elastomers and mixtures thereof. One particularly preferred elastomer is polychloroprene.

The adhesive part can further include additional components such an admixed phosphorous-based adhesion promoter or an admixed core-shell impact modifier swellable in the ethylenically unsaturated monomer. A preferred phosphorous-based adhesion promoter is an acrylate or methacrylate ester phosphate. Preferred impact modifiers are MBS impact modifiers, ASA impact modifiers, ABS impact modifiers and mixtures thereof, with MBS being particularly preferred. The adhesive part can further include at least one admixed reducing agent.

The metal molybdates of the adhesive part preferably contain divalent metals with zinc being particularly preferred. Likewise, the metal cations for metal salt of the ethylenically unsaturated carboxylic acid are preferably divalent metals. Preferred unsaturated carboxylic acids for the adhesive part are acrylic and methacrylic acid. One particularly preferred metal salt of acrylic or methacrylic acid is zinc dimethacrylate. More preferred amounts of the metal salt of the ethylenically unsaturated carboxylic acid range from about 0.25 to about 2.5 weight percent, with about 0.5 to about 2 weight percent being more preferable.

The ratio of the adhesive part to the activator part is preferably from about 20:1 to about 1:1, with about 15:1 to about 4:1 being more preferable. Free radical initiators for the activator part are preferably peroxides, hydroperoxides, and mixtures thereof, with benzoyl peroxide being particularly preferred. The activator part can further include an admixed epoxy resin such as a diglycidyl ether of Bisphenol-A. The activator part can also further include an admixed plasticizer.

In another embodiment, the present invention provides a curable adhesive composition including a mixture of an adhesive part and an activator part. The adhesive part includes (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid. The activator part includes a free radical generator. Preferred embodiments are as previously described.

In another embodiment, the present invention provides a laminate including a first substrate and a second substrate bonded thereto with a cured adhesive composition. The adhesive composition includes, in an uncured state, a mixture of an adhesive part and an activator part. The adhesive part includes (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid. The activator part includes a free radical generator. Preferred embodiments are as previously described.

The present invention also provides a method of preparing a laminate which includes contacting the surface of a first substrate with the surface of a second substrate with an adhesive composition therebetween. The adhesive composition includes a mixture of an adhesive part and an activator part, where the adhesive part includes (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid, and where the activator part includes a free radical generator. Preferred embodiments are as previously described. Substrates to be bonded are plastics, metals and combinations thereof. In an additional preferred embodiment, the surfaces of the substrates omit a primer prior to contacting.

In an alternative embodiment, the present invention provides a two-part adhesive system which includes an adhesive part being a mixture formed from (I) an ethylenically unsaturated monomer, (II) a metal molybdate, (III) an ethylenically unsaturated carboxylic acid, where the adhesive part is substantially free of a metal salt of an ethylenically unsaturated carboxylic acid, and an activator part which includes a free radical generator. Curable adhesive compositions, laminates, methods of laminating using this alternative two-part adhesive system are also provided.

Advantageously, the adhesives of the present invention provide an improved onset of handling strength while at the same time providing superior bond strength and fatigue resistance. These and other advantages of the present invention will become more apparent from the description set forth below.

BRIEF DESCRIPTION OF THE DRAWING

FIG. 1 is a plot graph illustrating the onset of handling strength as a function of time for adhesive samples incorporating varying levels of zinc dimethacrylate: (-▲-) 3.15 weight percent; (-★-) 2.5 weight percent; (-■-) 1 weight percent; and (-♦-) zero weight percent.

DETAILED DESCRIPTION OF THE INVENTION

The present invention provides a two-part adhesive system in which adhesive compositions formed therefrom exhibit improved onset of handling strength in addition to improved bond strength and fatigue durability. The first part of the adhesive system is an adhesive part is formed from a mixture which includes (I) an ethylenically unsaturated monomer, (II) a metal molybdate, (III) a metal salt of an ethylenically unsaturated carboxylic acid in an amount less than 3 weight percent, and (IV) an ethylenically unsaturated carboxylic acid, and optionally at least one of the following components: (V) an elastomeric material having a $T_g$ less than $-25°$ C. and soluble in the ethylenically unsaturated monomer; (VI) a phosphorous-based adhesion promoter, and (VII) a core-shell impact modifier swellable in the ethylenically unsaturated monomer. The second component is an activator part that includes a free radical generator. Advantageously, it has been found that the incorporation of less than 3 weight percent of a metal salt of an ethylenically unsaturated carboxylic acid provides a faster onset of handling strength (i.e., a deceased fixture time) than is achieved with an amount greater than 3 weight percent.

Ethylenically unsaturated monomers to be used in accordance with the invention are well known in the art. Such monomers are advantageously used in adhesive compositions due to their ability to undergo free radical polymerization thereby cross-linking to result in a cured composition. Ethylenically unsaturated monomers to be used include acrylate-based monomers, methacrylate-based monomers, non-acrylate based monomers or any combination thereof. The amount of ethylenically unsaturated monomers in the adhesive part is preferably at least about 30 weight percent (wt. %). Generally, the amount preferably ranges from about 30 to 75 weight percent, with about 40 to about 60 wt. % being more preferred. The actual amount of the ethylenically unsaturated monomer is variable and can be easily ascertained by one skilled in the art.

Acrylate-based monomers (i.e., acrylate-based ester monomers) to be used include, but are not limited to, polymerizable methacrylate esters and acrylate esters of the following general structures:

Methacrylate esters:

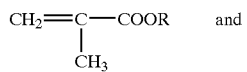

and

Acrylate esters:

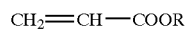

where "R" is a straight, branched, aromatic or cycloaliphatic hydrocarbon radical having 1 to 20 carbons with a hydrocarbon radical having 1 to 8 carbons being more preferred. In accordance with the invention, the hydrocarbon radical can be substituted with or have one or more carbon atoms replaced with a heteroatom (e.g., O, N, S). Likewise, the hydrocarbon radical can be unsaturated. Representative examples acrylate-based monomers include methyl methacrylate, ethyl methacrylate, butyl methacrylate, cyclohexyl methacrylate, 2-ethylhexyl methacrylate, phenoxyethyl methacrylate, and tetrahydrofurfuryl methacrylate. More preferably, the acrylate-based ester monomer is methyl methacrylate, ethyl methacrylate or combination thereof. The acrylate-based ester monomers can also include inhibitors, such as hydroquinone, naphthaquinone, methylhydroquinone (MEHQ), tetramethylhydroquinone(TMHQ), tert-butyl catechol or combinations thereof.

Non-acrylate based monomers to be used include aromatic and non-aromatic monomers (or dimers) containing reactive vinyl groups. An example of an aromatic monomer to be is used is styrene.

Elastomeric materials to be optionally used in accordance with the invention have a second order glass transition temperature ($T_g$) less than $-25°$ C. and are at least dispersible (preferably soluble) in the ethylenically unsaturated monomer. Preferably, the elastomers have a $T_g$ less than $-40°$ C. The elastomeric materials provide toughness to the adhesive composition. Useful elastomers include synthetic high polymers which exhibit plastic flow. Preferably, the elastomers to be used are supplied commercially as adhesive or cement grades. Elastomers useful in this invention are described in detail in the "Handbook of Plastics and Elastomers" pages 1–106–119, (1975) McGraw-Hill, Inc., which is hereby incorporated by reference. A preferred group of elastomers for use in accordance with the invention are polychloroprene (neoprene) and copolymers of butadiene or isoprene with styrene, acrylonitrile, acrylate esters, methacrylate esters, and the like. Additional useful elastomers are copolymers of ethylene and acrylate esters, homopolymers of epichlorohydrin and copolymers of epichlorohydrin and ethylene.

Particularly useful elastomers for certain embodiments of the invention are polychloroprene and block copolymers of styrene and butadiene or isoprene, such block copolymers being sold under the trademark Kraton® by Shell Oil Company. Block copolymers of styrene and diene monomers are described in detail in U.S. Pat. Nos. 4,041,103 and 4,242,470 which are herein incorporated by reference.

Representative examples of useful elastomeric polymers, using their letter designation according to ASTM D1418, their trade or common name and chemical description are: CR-Neoprene-polychloroprene; NBR-Nitrile rubber-butadiene acrylonitrile copolymer containing about 25 to about 45 weight percent acrylonitrile; COX-Hycar 1072-butadiene-acrylonitrile copolymer modified with carboxylic groups; SBR-GR-S-styrene-butadiene copolymer containing about 10 to about 30 weight percent styrene; ABR-Acrylic rubber acrylate butadiene copolymer; and CO, ECO-Hydrin 100 and 200-homopolymer or a copolymer of epichlorohydrin and ethylene oxide. Additional useful elastomers are copolymers of ethylene and acrylate esters, such as methyl acrylate and ethyl acrylate, wherein the copolymer preferably comprises at least 30 weight percent acrylate ester, which elastomers are sold commercially by Dupont under the VAMAC trademark.

The amount of elastomeric material to be utilized in the adhesive part is variable and partially dependent on the type of elastomer and ethylenically unsaturated monomer selected. These parameters can be easily ascertained by one skilled in the art. Generally, the amount of elastomer ranges from about 3 to about 35 wt. %, with about 6 to about 20 wt. % being preferred, and about 8 to about 15 wt. % being more preferred. One particularly preferred combination of elastomeric material and ethylenically unsaturated monomer is neoprene (e.g., DuPont Neoprene AD10) dispersed in methyl methacrylate. These dispersions/solutions are commonly known in the art as polymer-in-monomer solutions. A description of making these type of solutions is found in U.S. Pat. No. 5,945,461, which is incorporated herein by reference.

Phosphorous-based adhesion promoters to be optionally used in accordance with the invention are well known in the art. The adhesion promoters are incorporated into the adhesive part to improve adhesion to metal substrates. Preferred adhesion promoters are phosphate esters derived from phosphoric acid, which can include mono-, di-, or tri-esters. Hydroxyalkyl methacrylate or acrylate esters of phosphoric acid are more preferred, such as hydroxyethyl methacrylate and hydroxypropyl methacrylate mon-, di- and tri-esters of phosphoric acid. Representative examples to be used include, but are not limited to, mono-methacryloxyethyl phosphate (mono-HEMA phosphate ester), bis-methacryloxyethyl phosphate (bis-HEMA phosphate ester), mono-methacryloxypropyl phosphate (mono-HPMA phosphate ester), bis-methacryloxypropyl phosphate (bis-HPMA phosphate ester), and combinations thereof. One particularly preferred adhesion promoter is methacryloxyethyl acid phosphate. In addition, the phosphate adhesion promoter preferably contains at least about 90 wt. % mono- and di-esters in an equal amount which more preferably have an acid value between about 250 and 310. Generally, the amount of the adhesion promoter in the adhesive part ranges from about 0.5 to about 10 wt. %, with about 1 to about 5 wt. % being preferred, and about 2 to about 4 wt. % being more preferred.

In accordance with the invention, a metal molybdate salt is incorporated into the adhesive part to inhibit corrosion and improve environmental resistance. Preferred metals for the molybdate salt are divalent metals (e.g., group IIA and IIB metals) such as zinc, calcium, strontium, barium, among others. One particularly preferred metal molybdate salt is zinc molybdate. Metal molybdates are commercially available as a precipitate on a carrier or binder (e.g., zinc oxide, calcium carbonate, magnesium silicate (talc)). One group of commercially available zinc molybdates are sold as pigments under the tradename Molywhite® from Sherman-Williams. One particularly preferred Molywhite® pigment is Molywhite 101. The metal molybdate is incorporated into the adhesive part in a corrosion inhibiting amount. While the actual amount is variable and partially dependent on the ratio of metal molybdate to binder, the amount used generally ranges from about 0.1 to about 3 wt. %, with about 0.25 to about 1 wt. % being preferred, and about 0.4 to about 0.8 wt. % being more preferred.

A core-shell impact modifiers to be optionally used in accordance with the invention are well known in the art. The core-shell impact modifiers are swellable in the ethylenically unsaturated monomer (e.g., methyl methacrylate) but do not dissolve in the monomer. The impact modifiers are typically formed from graft copolymers. The core-shell graft copolymers have a "rubbery" core, and an outer "hard" shell. The "core" or backbone polymer of the graft copolymers preferably has a glass transition temperature substantially below ambient temperatures. The "shell" polymer which is grafted onto the backbone polymer preferably has a glass transition temperature substantially above ambient temperatures. Ambient temperature in this context is defined as the temperature range in which the adhesive is used. The impact modifiers provide excellent impact strength in addition to non-sag characteristics, excellent thixotropic properties and improved anti-sliding performance.

Examples of useful core-shell graft copolymers are those where "hard" monomers, such as styrene, acrylonitrile or methyl methacrylate, are grafted onto a rubbery core made from polymers of "soft" or "elastomeric" monomers, such as butadiene or ethyl acrylate. Examples of such core-shell copolymer to be used as impact modifiers are found in U.S. Pat. Nos. 3,984,497, 3,985,703, 4,034,013, 4,096,202, 4,304,709, 4,942,201 and 5,112,691, which are incorporated herein by reference. Preferred core-shell impact modifiers are methacrylate-butadiene-styrene (MBS) graft copolymers, styrene-butadiene-styrene (SBS) graft copolymers, and acrylate-styrene-acrylic acid (ASA) graft copolymers. Examples of those commercially available impact modifiers include PARALOID® BTA-753 from Rohm and Haas Company, KANE ACE B-564 from Kaneka Texas Corporation and Geloy 1020 from GE Plastics.

As will be apparent to one skilled in the art, the amount of core-shell impact modifier incorporated into the adhesive part should be sufficient to provide toughness to the adhesive and is thus variable. Generally, the amount ranges from about 5 to about 35 wt. %, with about 10 to about 25 wt. % being preferred, and about 15 to about 20 wt. % being more preferred.

The adhesive part of the invention also includes a metal salt of an ethylenically unsaturated carboxylic acid to facilitate cross-linking and curing of the adhesive. In accordance with invention, the metal salt (i.e., the metal ethylenically unsaturated carboxylate) is incorporated into the adhesive part in an amount less than about 3 wt. %. Surprisingly, it has been found that adhesives formed with less than 3 wt. % metal salt of an ethylenically unsaturated carboxylic acid exhibit an improved (i.e., faster) onset of handling strength than achieved with identical adhesives with greater than 3 wt. %. Preferably, the upper limit of the carboxylic acid metal salt should be less than or equal to about 2.5 wt. %, with about 2 wt. % or less being more preferred, and with 1.5 wt. % or less being even more preferred. Preferably, the lower limit of carboxylic acid metal salt should be greater than or equal to about 0.25 wt. %, with about 0.5 wt. % or greater being more preferred, and with 0.75 wt. % or greater being even more preferred. In addition, the above-described percentages for the metal salts refer to ex situ carboxylic acid metal salt incorporated into the adhesive part and not to metal carboxylates that can additionally form in situ upon mixing of the components.

As previously described, adhesives prepared with less than 3 wt. % ex situ metal carboxylates exhibit reduced fixture times as compared to comparative adhesives prepared with greater than 3 wt. % ex situ metal carboxylate. Preferably, the adhesives reach a handling strength of at least 800 pounds per square inch (PSI) with at least about 10 percent reduction in time as compared to comparative adhesives as measured by ASTM D1144. More preferably, the adhesives of the present invention exhibit at least about a 20 percent reduction in fixture time as compared to comparative adhesives.

Preferred metal cations for the metal ethylenically unsaturated carboxylates are divalent cations (e.g., group IIA and IIB metals) such as zinc, calcium, strontium, barium, magnesium, among others. A particularly preferred metal cation is zinc. Preferred ethylenically unsaturated carboxyl anions for the carboxylates are derived from ethylenically unsaturated carboxylic acids such as those disclosed in U.S. Pat. Nos. 4,714,730 and 4,959,405, which are herein incorporated by reference. The ethylenically unsaturated carboxylic acids to be used include monocarboxylic acids, polycarboxylic acids or combinations thereof. Representative examples of these unsaturated carboxylic acids are acrylic acid, methacrylic acid, maleic acid, fumaric acid, citraconic acid, mesaconic acid, acontic acid, traumatic acid, muconic acid, or combinations thereof, with acrylic and methacrylic acid being particularly preferred. Polycarboxylic acids (e.g., dicarboxylic acids) to be used with the invention can also be in the form of mono-ester alkyls of these acids. Preferably, the alkyl radical has 1 to 18 carbons, with 1 to 6 carbons being more preferred. Unsaturated monocarboxylic acids also be in the form of hydroxy alkyl- (or hydroxy aryl-) acrylate and methacrylate acid esters of saturated di-and tri-carboxylic acids. Preferred hydroxy alkyl radicals have 1 to 10 carbons, with 2 to 4 carbons being preferred. Preferred ethylenically unsaturated carboxylic acids salts are zinc, calcium, and magnesium salts of acrylic and methacrylic acid. One particularly preferred metal ethylenically unsaturated carboxylate is zinc dimethacrylate.

In another embodiment, the adhesive part is prepared without the above-described metal carboxylate salt (i.e., is substantially free of a metal carboxylate). The omission of the metal carboxylate has been found to provide a surprising increase in working time as compared to adhesives where the adhesive part includes the above-described metal carboxylate. In fact, adhesives prepared with an adhesive part substantially free of a metal carboxylate exhibit working times of at least about 10 minutes.

In accordance with the invention, the adhesive part also includes ethylenically unsaturated carboxylic acids such as those described above for the carboxyl anions. The ethylenically unsaturated carboxylic acids to be used include monocarboxylic acids, polycarboxylic acids or combinations thereof. In one embodiment, the ethylenically unsaturated carboxylic acids in the adhesive part have the same moiety as the carboxylate anions for the metal salt. Preferred acids are unsaturated carboxylic acids such as acrylic acid, methacrylic acid, maleic acid, fumaric acid, citraconic acid, mesaconic acid, acontic acid, traumatic acid, muconic acid, or combinations thereof, with methacrylic acid being particularly preferred. The amount used generally ranges from about 1 to about 10 wt. %, with about 3 to about 7 wt. % being preferred.

The adhesive part can further include one or more reducing agents. Reducing agents to be used are known in the art.

Useful reducing agents include dimethyl-p-toluidine, N,N-dimethylaniline, diethyl-p-toluidine, diethyl-m-toluidine, bis-propoxy-p-toluidine, N,N-diethylaniline, N-ethyl, N-hydroxy ethyl-m-toluidine, N,N-dimethyl-p-toluidine (DMPT), bis-hydroxyethyl-p-toluidine (HEPT), bis-hydroxyethyl-m-toluidine (HEMT) and the like. The amount of reducing agent is variable and partially dependent on the type of activator used. The amount of reducing agent to be incorporated into the adhesive part generally ranges from about 0.1 to about 2 wt. %. These parameters can be easily ascertained by one skilled in the art.

The activator part of the present invention includes at least a free radical initiator to effect cross-linking upon mixing the adhesive and activator parts. Free radical initiators to be used in accordance with the invention are known in the art. Examples of initiators to be in accordance with the invention include peroxides, hydroperoxides, peresters, peracids, azo compounds, radiant or UV energy and heat. Representative examples of peroxide and hydroperoxide compounds include, but are not limited to, benzoyl peroxide, cumene hydroperoxide, tertiary butyl hydroperoxide, dicumyl peroxide, tertiary butyl peroxide acetate, tertiary butyl perbonzoate, and combinations thereof. Benzoyl peroxide is a particularly preferred free radical initiator. Likewise, heat energy can additionally be applied to the adhesive to facilitate free radical generation.

The free radical initiators are generally commercially available with a carrier in solid form or in liquid form (e.g., an epoxy resin or plasticizer) including solutions, suspensions, emulsions and pastes. The carrier can also includes additional excipients that are inert to the initiators under normal storage conditions. Examples of excipients include, but are not limited to, water, plasticizers, surfactant, thickening agents and so on. Extra amounts of those ingredients can be added to adjust the concentration of the initiators in the activator part, or the viscosity and specific gravity of the activator part. The carrier should normally be less than 20% based on the total weight of the adhesive part and activator part, preferably less than 10%.

In a preferred embodiment, the activator part of the present invention includes a epoxy resin or polyepoxide as a carrier and a compatibilizer. Epoxy resins or polyepoxides to be used in accordance with the invention can be monomeric or polymeric, saturated or unsaturated, aliphatic, cycloaliphatic, aromatic or heterocyclic and they can be substituted, if desired, with other substituents besides epoxy groups, e.g., hydroxyl groups, ether radicals, halogen atoms, and the like. Epoxy resins suitable in the practice of this invention include those disclosed in U.S. Pat. Nos. 2,500,600 and 2,324,483 which are incorporated herein by reference. One particularly preferred epoxy resin is a liquid diglycidyl ether of Bisphenol-A, which is commercially available from Shell Oil Co., under the tradename EPON 828. The amount of the epoxy resin to be used is variable and generally in a 10:1 adhesive:activator system can range from about 0.1 to about 50 wt. %, with about 10 to about 40 wt. % being preferred, and about 15 wt. % to about 25 wt. % being more preferred.

Likewise, the activator part preferably includes a plasticizer to improve the flexibility of the cured adhesive as well impact strength under temperatures below the elastomers $T_g$.

Examples of plasticizers that can be used include phthalates, succinates, and adipates, such examples are dibutyl phthalate, diisobutyl phthalate, diisodecyl adipate, butyl benzyl phthalate, Santicizer 278, dioctyl succinate, and mixtures thereof.

The activator part can further include the above-described impact modifiers to provide additional impact strength to the adhesive of the invention. The amount of impact modifier incorporated from about 5 to about 25 wt. %, with about 10 to about 20 wt. % being preferred.

In accordance with the invention, both the adhesive and activator parts can further include thickening agents to alter viscosity, specific gravity and thixotropic properties. In one particular embodiment the adhesive part preferably, at room temperature, has a viscosity of about 80,000 to about 110,000 centipose per second (cps). In another particular embodiment, the activator part preferably, at room temperature, has a viscosity of about 50,000 to about 70,000 cps.

The adhesive and activator parts can also include free-radical inhibitors/retarders to increase the shelf-life of the components and to improve the curing profiles of the adhesives. These compounds act to suppress the polymerization of monomers by reacting with the initiating and propagating radicals and converting them either to non-radical species or radicals of reactivity too slow to undergo propagation. Common inhibitors and retarders can be found in "Principles of Polymerization" by George Odian, pp. 262–266, $3^{rd}$ edition, published by Wiley Interscience, incorporated by reference.

As previously described, the adhesives are advantageously provided in a two-part system with an adhesive part and an activator part component being separate prior to use. The two components are combined (i.e., mixed together) just prior to use since the mixed composition has a limited working time (e.g., up to about 5 minutes at 25° C. for a half-inch bead). Preferably, the two components are sufficiently mixed to obtain a homogenous composition. The mixing of the two components are achieved by any method known in the art. The ratio of adhesive to activator is variable and preferably ranges from about 20:1 to 1:1 by volume, with about 15:1 to about 4:1 being more preferred. One particularly preferred ratio to be used is about a 10:1 ratio by volume of the adhesive:activator.

The present invention also provides an adhesive composition prepared by mixing the adhesive and activator parts of the above-described two-part system. As will be apparent to one skilled in the art, the adhesive composition is thus a reaction product prepared from the two components in which curing is effected by the cross-linking of the ethylenically unsaturated moieties. In addition to improved onset of handling strength, the adhesives exhibit good metal adhesion, peel strength, shear strength, dynamic fatigue, gap-filling ability, environmental and corrosion durability, chemical resistance, and impact strength.

A particlarly preferred compositions of the adhesive and activator portions of the two-part adhesive of the invention, are set forth below in Tables 1 and 2.

TABLE 1

Composition of Adhesive Part

| Components: (Weight Percent) | Acceptable Range | Preferred Range |
|---|---|---|
| Methyl Methacrylate (MMA) | 30–75 | 40–60 |
| Chlorinated Rubber (chloroprene) | 5–20 | 8–12 |
| Hydroxyalkyl Phosphoric Acid Ester | 1–5 | 2–3 |
| Methacrylic Acid (MAA) | 1–10 | 4–6 |
| Zinc dimethacrylate | 0–2.5 | 0.5–1.5 |
| MBS core-shell | 5–35 | 15–25 |
| Zinc Molybdate on Binder | 0.2–4 | 0.3–0.8 |

TABLE 2

Composition of Activator Part

| Components: (Weight Percent) | Acceptable Range | Preferred Range |
|---|---|---|
| Plasticizer | 10–30 | 15–25 |
| MBS core-shell | 5–25 | 10–20 |
| Bisphenol-A Epoxy Resin | 5–60 | 15–35 |
| Peroxide Free Radical Generator | 5–25 | 11–22 |

The adhesives of the invention are used to bond a variety of substrates for various purposes. In fact, one advantageous use of the adhesives is in gap-filling applications that do not require anaerobic conditions. Substrates to be bonded with adhesives include those disclosed in U.S. Pat. No. 4,714,730 and include thermoplastics, thermosets, resins, composite resins, including polyester/glass, urethane/glass, epoxy/glass, epoxy graphite and epoxy-kevlar surfaces along with metals such as aluminum, steel (carbon and stainless), nickel, titanium and alloys thereof. The adhesives can be used to bond both primed and non-primed surfaces. In fact, the adhesives of the present invention are particularly useful for bonding non-primed substrates (e.g., substrates that omit a primer). Typically, the surface of a first substrate is contacted with the surface of a second substrate with the adhesive on either or both surfaces.

In another embodiment of the invention, a laminate is provided which includes a first substrate bonded to a second substrate with a cured adhesive formed from the above-described two-part system.

The following non-limiting examples illustrate the improved properties of the adhesive systems of the present invention. All percentage are by weight unless noted otherwise.

EXAMPLES

Stock Solutions and Non-ASTM Test Methods
Chloroprene-in-Methyl Methacrylate:

The chloroprene in methyl methacrylate (MMA) syrup was prepared by rolling 300 parts by weight of Dupont Neoprene AD10 and 1700 parts by weight of MMA in a glass bottle for about 2 days to obtain 15 wt. % polymer-in-monomer solution.

Zinc Molybdate Dispersion:

An 80 wt. % Molywhite 101 dispersion was prepared by high speed dispersing 80 parts by weight Molywhite 101 in 19.5 parts by weight diisobutyl phthalate (DIBP), and 0.45 parts by weight BYK 1142 (dispersant).

Sodium EDTA Solution:

A 5 wt. % Sodium EDTA solution was prepared by dissolving 20 parts by weight of Sodium EDTA in 190 parts by weight water and 190 parts by weight of 99% isopropanol.

Exotherm and Cure Analysis:

Peak exotherms were measured by placing 10 grams of adhesive in a 20 ml polyethylene beaker to 10.0+0.5 grams. The 20 ml beaker was then inserted into a 100 ml polyethylene beaker containing ~1 inch of insulatation on the bottom. The adhesive and activator were controlled to 25+0.5° C. for testing. A Type J thermocouple was placed in the center of material mass, and a notched cover for the probe width was placed over the insulating beaker. Peak temperature was recorded in degrees farenheight and time in minutes and nearest 15 seconds.

Comparative Example 1

A comparative adhesive formulation (sample 1) was prepared by mixing an adhesive part having the components listed in Table 3 with an activator part having the components listed in Table 4 in approximately a 10:1 volumetric ratio of adhesive to activator.

Table 3 shows that the comparative adhesive (sample 1) reached a handling strength of 800 pounds per square inch (PSI) for a 0.030 inch bead in 32 minutes as determined following ASTM D1144. Thus, the fixture time for sample 1 was just over a half an hour. The development of strength for sample 1 is also shown in FIG. 1(-▲-).

Inventive Examples 2–8

Inventive adhesives (samples 2–8) were prepared as in Example 1 with decreasing amounts of a group II metal methacrylate salt (zinc dimethacrylate) to a certain the effect of lower concentrations on adhesive properties. The samples were prepared with less than 3 weight percent ex situ zinc dimethacrylate: 2.5; 1; 0.8; and 0 wt. %. The sample were evaluated in the same manner as sample 1. The formulations and test data for samples 2–8 are shown in Table 3.

From Table 3, it is apparent that with decreasing concentrations of zinc dimethacrylate a decrease in fixture time was observed. For example, comparative sample 1 with 3.15 wt. % zinc dimethacrylate exhbited a fixture time of 32 minutes. Sample 2 which contained 2.5 wt. % zinc dimethacrylate exhibited a fixture time of 29 minutes. Sample 3 which contained 1 wt. % zinc dimethacrylate exhibited a fixture time of 24 minutes. Likewise, sample 8 which contained 0.8 wt. % zinc dimethacrylate exhibited a fixture time of 25 minutes. The development of strength for samples 2 and 3 are also shown in FIG. 1 ((-★-) and (-■-), respectively). Thus, the inventive samples exhibited reduced fixture times while exhibiting equivalent open times (4 to 5 minutes). This was considered surprising since the use of decreasing amounts of zinc dimethacrylate would have normally been expected to result in increased fixture times (e.g., greater than 32 minutes as exhibited by comparative sample 1).

Moreover, sample 8 which was prepared with no zinc dimethacrylate exhibited an unexpected increase in working time by exhibiting an open time of 10 minutes. This was double the working times of comparative sample 1 and inventive samples 2, 3 and 8. The development of strength for sample 8 is also shown in FIG. 1(-♦-)

TABLE 3

| Samples | Value | Test Method | 1 | 2 | 3 | 4 |
|---|---|---|---|---|---|---|
| MMA | Wt. % | | | | | 4 |
| 15% Chloroprene in MMA syrup | Wt. % | | 68.90 | 69.50 | 71.00 | 70.00 |
| 1,4-Napthoquinone (NQ, in ppm) | Wt. % | | 0.000012 | 0.000012 | 0.000012 | 0.000012 |
| 5% Sodium EDTA solution in 50/50 water/isopropanol | Wt. % | | 0.95 | 1 | 1 | 1 |
| N,N-dimethyl-para-toluidine (DMPT) | Wt. % | | 0.7 | 0.7 | 0.7 | |
| Bis-hydroxyethyl-para-toluidine (HEPT) | Wt. % | | | | | 0.7 |
| Bis-hydroxyethyl-meta-toluidine (HEMT) | Wt. % | | | | | |
| Bis-methacryloxyethyl phosphate (P2M) | Wt. % | | 1.95 | | 1.95 | 1.95 |
| Mono-methacryloxyethyl phosphate (P1M) | Wt. % | | | 1.95 | | |
| Methacrylic Acid (MAA) | Wt. % | | 4.7 | 4.7 | 4.7 | 4.7 |
| Zinc dimethacrylate (Sartomer SR708) | Wt. % | | 3.15 | 2.5 | 1 | 1 |
| MBS core-shell (Paraloid BTA-753) | Wt. % | | 19 | 19 | 19 | 16 |
| 80 wt. % Molywhite 101 ED dispersion | Wt. % | | 0.65 | 0.65 | 0.65 | 0.65 |
| Total Weight | Wt. % | | 100.00 | 100.00 | 100.00 | 100.00 |
| Exotherm, time to peak Temperature | Minutes: Seconds | Plexus | 12:15 | 12:45 | 12:00 | 27:00 |
| Exotherm, peak temperature | ° F. | Plexus | 267 | 255 | 267 | 285 |
| Open Time | Minutes | ASTM D1338 | 4 | 4½ | 4 | 16 |
| Time to 800 psi @ 0.030" (Fixture Time) | Minutes | ASTM D1144 | 32 | 29 | 24 | 85 |
| Lap Shear Unexposed Cold Rolled Steel (CRS) | PSI | ASTM D1002 | 2000 | — | 2200 | 2215 |
| Additional Properties | | | | | | |
| 14 days 5% salt fog % retention | CRS 1010 | | 90% | | 103% | 93% |
| 14 days 5% salt fog % retention | Aluminum 6061-T6 | | 45% | | 86% | 70% |
| 14 days 5% salt fog % retention | Stainless Steel 304 | | 99% | | 103% | 96% |
| T-peel CRS 1010 0.060" ASTM D1875 | Lb./linear inch | | 60 | — | 60 | 50 |
| Fatigue to AL 6061 1/16", ASTM D3613 | 50% of ult. Strength | | | | 8,000,000 + NF | |
| Lap shear Unexposed | Aluminum 6061 | | 2453 | | 2453 | 2676 |
| | Stainless steel 304 | | 2183 | | 2388 | 2580 |
| | Cold-rolled steel | | 2132 | | 2240 | 2215 |
| Lap shear 14 d. Salt spray 24 hr. recovery | Aluminum 6061 | | 1107 | | 2112 | 1870 |
| | Stainless steel 304 | | 2157 | | 2450 | 2482 |
| | Cold-rolled steel | | 1923 | | 2318 | 2029 |
| Lap shear 31 d. Salt spray 24 hr. recovery RT | Aluminum 6061 | | 700 | | 1293 | 1380 |
| | Stainless steel 304 | | 2414 | | 2353 | 2418 |
| | Cold-rolled steel | | 1263 | | 1945 | 1929 |

TABLE 3-continued

| | Value | 5 | 6 | 7 | 8 |
|---|---|---|---|---|---|
| Samples | | | | | |
| MMA | Wt. % | 4 | 2.5 | | |
| 15% Chloroprene in MMA syrup | Wt. % | 70.00 | 71.00 | 69.05 | 72.10 |
| 1,4-Napthoquinone (NQ, in ppm) | Wt. % | 0.000012 | 0.000012 | 0.000012 | 0.000012 |
| 5% Sodium EDTA solution in 50/50 water/isopropanol | Wt. % | 1 | 1 | 0.09 | 0.9 |
| N,N-dimethyl-para-toluidine (DMPT) | Wt. % | 0.7 | 0.7 | 0.7 | |
| Bis-hydroxyethyl-para-toluidine (HEPT) | Wt. % | | | | |
| Bis-hydroxyethyl-meta-toluidine (HEMT) | Wt. % | 0.7 | | | |
| Bis-methacryloxyethyl phosphate (P2M) | Wt. % | 1.95 | | 2.5 | 1.95 |
| Mono-methacryloxyethyl phosphate (P1M) | Wt. % | 1.95 | | | |
| Methacrylic Acid (MAA) | Wt. % | 4.7 | 4.7 | 4.7 | 4.7 |
| Zinc dimethacrylate (Sartomer SR708) | Wt. % | 1 | 1 | 0.8 | 0 |
| MBS core-shell (Paraloid BTA-753) | Wt. % | 16 | 19 | 19 | 19 |
| 80 wt. % Molywhite 101 ED dispersion | Wt. % | 0.65 | 0.65 | 0.66 | 0.65 |
| Total Weight | Wt. % | 100.00 | 100.00 | 100.00 | 100.00 |
| Exotherm, time to peak Temperature | Minutes: Seconds | 52:00 | 12:15 | 12:30 | 23:00 |
| Exotherm, peak temperature | ° F. | 295 | 284 | 285 | 264 |
| Open Time | Minutes | 30 | 5 | 5 | 10 |
| Time to 800 psi @ 0.030" (Fixture Time) | Minutes | 100 | 26 | 25 | 44 |
| Lap Shear Unexposed Cold Rolled Steel (CRS) | PSI | 2220 | — | 2050 | — |
| Additional Properties | | | | | |
| 14 days 5% salt fog % retention | CRS 1010 | | | | |
| 14 days 5% salt fog % retention | Aluminum 6061-T6 | | | | |
| 14 days 5% salt fog % retention | Stainless Steel 304 | | | | |
| T-peel CRS 1010 0.060" ASTM D1875 | Lb./linear inch | 55 | — | 55 | — |
| Fatigue to AL 6061 1/16", ASTM D3613 | 50% of ult. Strength | | | | |
| Lap shear Unexposed | Aluminum 6061 Stainless steel 304 Cold-rolled steel | | | | |
| Lap shear 14 d. Salt spray 24 hr. recovery | Aluminum Stainless steel 304 Cold-rolled steel | | | | |

TABLE 3-continued

| Lap shear | Aluminum |
| --- | --- |
| 31 d. Salt spray | 6061 |
| 24 hr. recovery RT | Stainless steel 304 |
| | Cold-rolled steel |

TABLE 4

| Activator | | |
| --- | --- | --- |
| Component | Supplier | Wt. % |
| Plasticizer (diisodecyl adipate) | CP Hall | 18.25 |
| Kraton G1652 | Kraton Polymers | 3.15 |
| MBS Core-Shell (Paraloid BTA 753) | Rohm & Haas | 17.20 |
| Bisphenol-A Epoxy (Epon 828) | Performance Polymers | 21.40 |
| Benzoyl Peroxide | Elf Atochem | 40.00 |

TABLE 4-continued

| Activator | | |
| --- | --- | --- |
| Component | Supplier | Wt. % |
| 55% Active (Luperco ANS) | | |
| Total | | 100.00 |

Inventive Examples 9–11

Samples 9–11 were prepared to ascertain the utility of other elastomers in the adhesives of the invention. The adhesives were prepared in the same manner as in the previous examples using a 10:1 volumetric ratio of adhesive to activator. Samples 10 and 11 were prepared with equivalent amounts of commercially available elastomers (Nipol 1472 and Kraton 1116, respectively) dispersed/dissolved in methyl methacrylate. The components and test data are shown in Table 5.

TABLE 5

| | | Samples 9–11 | | |
| --- | --- | --- | --- | --- |
| | Tradenames | 9 | 10 | 11 |
| MMA | | | 8.849988 | 8.849988 |
| Carboxylated Chloroprene in MMA (25%) | Neoprene AF | 68.849988 | | |
| Nipol 1472 solution in MMA (25%) | Nipol 1472 | | 60 | |
| Kraton 1116 solution in MMA (25%) | Kraton 1116 | | | 60 |
| 1,4-Napthoquinone | NQ | 0.000012 | 0.000012 | 0.000012 |
| 5% Sodium EDTA solution in 50/50 water/isopropanol | EDTA, sodium salt | 0.9 | 0.9 | 0.9 |
| Parafin wax, 30% solution in MMA | Boler Wax 120–155° F. Melting Point | 3.3 | 3.3 | 3.3 |
| N,N-dimethyl-para-toluidine (DMPT) | DMPT | 0.7 | 0.7 | 0.7 |
| Bis-hydroxyethyl-para-toluidine (HEPT) | HEPT | | | |
| Bis-hydroxyethyl-meta-toluidine (HEMT) | HEMT | | | |
| Bis-methacryloxyethyl phosphate (P2M) | P2M | 2 | 2 | 2 |
| Mono-methacryloxyethyl phosphate (P1M) | P1M | | | |
| Methacrylic Acid (MAA) | MAA | 4.7 | 4.7 | 4.7 |
| Zinc dimethacrylate (Sartomer SR708) | SR708 | 1 | 1 | 1 |
| MBS core-shell (Paraloid BTA-753) | Paraloid KM 753 | 17.9 | 17.9 | 17.9 |
| Molywhite 10 dispersion | Molywhite 101 | 0.65 | 0.65 | 0.65 |
| Total Weight | | 100.00 | 100.00 | 100.00 |
| Open Time, minutes @ 0.5" | Minutes | 4.5 | 6.5 | 6 |
| Exotherm peak time, min:sec | Minutes:seconds | 13:30 | 16:00 | 11:15 |
| Exotherm peak temperature, ° F. | ° F. | 256 | 255 | 267 |
| Time to 800 psi @ 0.030" | Minutes | 29 | 35 | 24 |
| Lap shear, ASTM D1002, 0.05 inch/minute | Aluminum 6061 | 1948 CF* | 1912 CF | 1692 CF |

*CF—cohesive failure

Examples 12–13

Samples 12 and 13 were prepared to ascertain the utility of other zinc molybdates dispersions in lieu of Molywhite 101 as used in the previous examples. Samples 12 and 13 were prepared with equivalent amounts of Molywhite 212 and Molywhite 92 as shown in Table 6. As shown in Table 6, both inventive adhesives exhibited fixture times of less than 24 minutes with 20 minutes for sample 12 and 22 minutes for sample 13.

TABLE 6

| | | Samples 12–13 | |
|---|---|---|---|
| | | 12 | 13 |
| MMA | | | |
| 15% Chloroprene in MMA | Dupont AD-10 | 70.22 | 69.96 |
| 1,4-Napthoquinone (NQ, in ppm) | | 0.000012 | 0.000012 |
| 5% Sodium EDTA solution in 50/50 water/isopropanol | Aldrich Sodium EDTA | 0.94 | 0.94 |
| N,N-dimethyl-para-toluidine (DMPT) | First Chemical DMPT | 0.7 | 0.7 |
| Bis-hydroxyethyl-para-toluidine (HEPT) | Cognic Emery 5710 | | |
| Bis-hydroxyethyl-meta-toluidine (HEMT) | Cognis Emery 5714 | | |
| Bis-methacryloxyethyl phosphate (P2M) | P2M | 1.95 | 1.95 |
| Methacrylic Acid (MAA) | | 4.7 | 4.7 |
| Zinc dimethacrylate (Sartomer SR708) | Sartomer SR708 | 1 | 1 |
| MBS core-shell (Paraloid BTA-753) | Paraloid BTA 753 | 18.5 | 18.5 |
| 70% Molywhite 212 in DIBP | Sherman Williams Molywhite 212 | 1.24 | |
| 55% Molywhite 92 in DIBP | Molywhite 92 | | 1.5 |
| 30% Parafin wax paste in MMA | Boler Wax | 0.75 | 0.75 |
| Total Weight | | 100 | 100 |
| Open Time ASTM D1338 | | 4.5 | 5 |
| Exotherm peak time 10 gms, minutes | | 12:00 | 12:45 |
| Exotherm peak temperature 10 gms, ° F. | | 246 | 263 |
| Time to 800 psi @ 0.030" ASTM D1144 | | 20 | 22* |
| Unexposed Cold Rolled Steel 1010 ASTM D 1002 | | — | — |
| Unexposed Aluminum 6061 ASTM D1002 | | 2553 | 2501 |

*Shear Adh.

| Time, min | PSI |
|---|---|
| 5 | 0 |
| 10 | 3 |
| 15 | 35 |
| 20 | 308 |
| 24 | 1272 |
| 28 | 1343 |
| 32 | 1740 |

What is claimed is:

1. A two-part adhesive system with an improved onset of handling strength, comprising:
   (a) an adhesive part being a mixture formed from (I) an ethylenically unsaturated monomer selected from the group consisting of acrylate ester monomer, methacrylate ester monomer, or mixtures thereof, (II) a metal molybdate, (III) an ethylenically unsaturated carboxylic acid selected from the group consisting of acrylic acid, methacrylic acid, or mixtures thereof, wherein said adhesive part is substantially free of a metal salt of an ethylenically unsaturated carboxylic acid; and
   (b) an activator part which includes a free radical generator.

2. The adhesive system of claim 1, wherein said adhesive part further comprises an admixed elastomeric material having a $T_g$ less than −25° C. and soluble in said ethylenically unsaturated monomer.

3. The adhesive system of claim 2, wherein said elastomeric material is selected from the group consisting of polychloroprene, polyacrylonitrile-butadiene copolymers, copolymers of styrene and isoprene, copolymers of styrene and butadiene, carboxylated polychloroprenes, carboxylated polyacrylonitrile-butadiene copolymers, copolymers of ethylene and vinyl acetate, copolymers of styrene and olefinically unsaturated hydrocarbons, polybutylene, acrylate-based elastomers and mixtures thereof.

4. The adhesive system of claim 3, wherein said elastomeric material is polychloroprene.

5. The adhesive system of claim 1, wherein said adhesive part further comprises an admixed phosphorous-based adhesion promoter.

6. The adhesive system of claim 5, wherein said phosphorous-based adhesion promoter is an acrylate or methacrylate ester phosphate.

7. The adhesive system of claim 1, wherein said adhesive part further comprises an admixed core-shell impact modifier swellable in said ethylenically unsaturated monomer.

8. The adhesive system of claim 7, wherein said core-shell impact modifier is selected from the group consisting of MBS impact modifiers, ASA impact modifiers, ABS impact modifiers and mixtures thereof.

9. The adhesive system of claim 8, wherein said core shell impact modifier is methacrylate-butadiene-styrene graft copolymer.

10. The adhesive system of claim 1, wherein said metal of said metal molybdate is a divalent metal.

11. The adhesive system of claim 10, wherein said divalent metal is zinc.

12. The adhesive system of claim 1, wherein said adhesive part and said activator part are in a ratio from about 20:1 to about 1:1.

13. The adhesive system of claim 12, wherein said ratio is from about 15:1 to about 4:1.

14. The adhesive system of claim 1, wherein said free radical generator is selected from the group consisting of peroxides, hydroperoxides, and mixtures thereof.

15. The adhesive system of claim 14, wherein said free radical generator is benzoyl peroxide.

16. The adhesive system of claim 1, wherein said adhesive part further comprises at least one admixed reducing agent.

17. The adhesive system of claim 1, wherein said activator part further comprises an admixed epoxy resin.

18. The adhesive system of claim 17, wherein said epoxy resin is a diglycidyl ether of Bisphenol-A.

19. The adhesive system of claim 1, wherein said activator part further comprises an admixed plasticizer.

* * * * *